Dec. 18, 1934.    O. S. McCURDY    1,984,889
PISTON RING JOINT
Filed Dec. 4, 1931
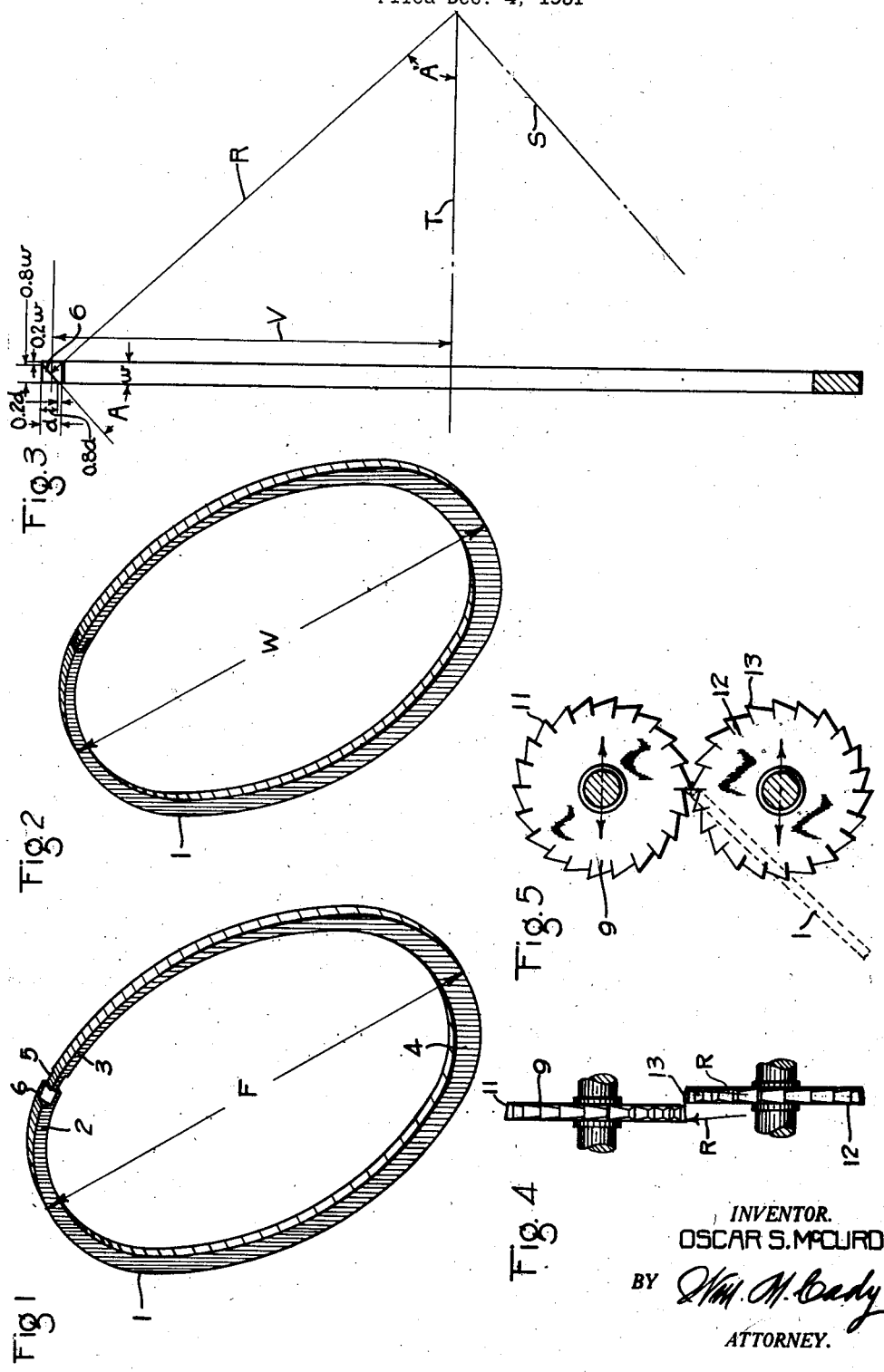
INVENTOR.
OSCAR S. McCURDY.
BY [signature]
ATTORNEY.

Patented Dec. 18, 1934

1,984,889

UNITED STATES PATENT OFFICE 1,984,889

PISTON RING JOINT

Oscar S. McCurdy, Pittsburgh, Pa., assignor to The Westinghouse Air Brake Company, Wilmerding, Pa., a corporation of Pennsylvania Application December 4, 1931, Serial No. 578,995

4 Claims. (Cl. 309—46)

This invention relates to piston rings and particularly to split piston rings of the step-cut type.

When pistons are used in the control and actuating apparatus of a fluid train brake system, it is essential to provide piston rings that will prevent leakage of fluid past the piston. This is particularly true where it is necessary to retain fluid under pressure within a cylinder over a considerable period of time. In such cases the leakage at the end of the split ring, though small, becomes a material factor.

Accordingly, many forms of split step-cut rings have been devised to prevent leakage of fluid past the overlapping portion and a form of joint found to be relatively effective is one where the overlapping portions provide diagonally disposed sealing surfaces constituting a section of a cylinder.

Rings of this type have been used, but heretofore the radii of the cylinder surfaces of the overlapped joint had been more or less arbitrarily fixed, and a cutter for forming a cylindrical surface of predetermined radius has been used for cutting the overlapping surfaces of rings of different diameter.

The result of this practice is to produce overlapping surfaces that do not maintain a tight sealing contact with one another throughout the extent of the surfaces, and this condition becomes exaggerated as the ring becomes worn and the ends separate. Leakage sufficient to impair the effectiveness of the apparatus with which the rings are associated results from this condition.

It is obvious that the ideal form of the overlapping diagonally disposed surfaces should be conical with the apex of the cone coincident with the longitudinal axis of the working circumference of the rings, but due to the great difficulty inherent in the production of a conical surface, especially on a fragile piston ring and special machinery required for the purpose, it is commercially impracticable to construct a piston ring with conical engaging surfaces at the joint.

A compromise is therefore commercially desirable in order to produce the rings in large quantities and at relatively low cost. Through experiment I have found that a sealing surface which closely approximates a conical surface in its capacity to prevent leakage is obtained by using a cylinder surface having a radius that bears certain definite relations to the working and free diameters of the ring, the width and depth of the ring and the angle of the surface with respect to the flat side thereof, and that rings made in accordance with the following formula have been found to be highly efficient and uniformly effective to prevent leakage throughout the range of piston ring sizes commercially employed.

It is therefore an object of this invention to economically produce a ring having the above noted characteristics of sealing effectiveness and to provide a formula whereby the proper cylinder radius of the overlapping surfaces may readily be determined for a ring having any desired dimensions, thus insuring maximum and uniform sealing performance in each ring regardless of its dimensions.

These and other objects that will be made apparent throughout the further description of the invention are attained in the piston ring and by the formula hereinafter described and illustrated in the accompanying drawing, wherein:

Fig. 1 is a perspective view of an improved piston ring in free condition with its ends separated;

Fig. 2 is a perspective view of the improved ring, shown in working or compressed condition with the free ends overlapping;

Fig. 3 is a diagrammatic representation of a piston ring illustrating the dimensional factors of the formula for determining the proper cylinder radius for the overlapping sealing surfaces of the piston ring;

Fig. 4 is a front elevational view of the milling cutters employed in forming the overlapping sealing surfaces of a piston ring; and Fig. 5 is a side elevational view of the cutters shown in Fig. 4.

Referring to the drawing, a piston ring 1 embodying features of my invention is disclosed in Fig. 1. The ring is of the eccentric type wherein the ends 2 and 3 are of less depth than the central portion 4, the purpose being to provide a substantially uniform circumferential pressure against the cylinder wall when the ring expands thereagainst. In order to prevent the escape of fluid past the joint of the piston ring, the free ends are provided with overlapping portions comprising a tongue 5 on the free end 3 and a notch 6 on the free end 2 of the ring and which is adapted to receive the tongue 5 and constitute therewith a fluid tight joint when the ring is in the working or compressed condition as shown in Fig. 2.

The cooperating surfaces of the tongue 5 and notch 6 preferably constitute a section of the surface of a cylinder because such surfaces may be readily cut by milling cutters, to be hereinafter described, without requiring expensive and intricate machining operations. It has been found that in order to insure a fluid tight joint, considerable care must be taken to provide overlapping surfaces that will maintain a fluid tight joint when the piston ring is in the working position and when it has become worn and the ends are slightly separated from one another.

By considerable experimenting I have determined that the ideal cylindrical surface is one that bears a definite relation to the free and working diameters of the piston ring, the width and depth of the ring at the joint, and the angle of the overlapping sealing surfaces with respect to the flat side of the piston ring. By making the rings with overlapped portions each constituting a section of a cylindrical surface having a radius R of definite length with respect to the above referred to dimensions of the ring, and an axis S intersecting the axis of the ring, uniform effectiveness of operation results regardless of the dimensions thereof.

In practicing my invention, the angle of the overlapping surfaces is determined as indicated in Fig. 3 by the point at which it is desired to have the surface of the cylinder intersect the circumference of the ring and an adjacent side thereof. I have found that best results are obtained when the cylindrical surface of the imaginary cylinder intersects the side of the piston ring at a point spaced from the inner circumference a distance equal to 0.2 of the depth $d$, and the circumferential working surface at a distance from the opposite side equal to 0.2 $w$ as indicated in Fig. 3. This disposition of the overlapped surface insures overlapping of the working peripheral surface and the plane surface of the side of the piston ring at the joint.

The radius of the imaginary cylinder which affords a sealing surface giving the most effective joint is equal to the length of a line drawn between a point on and normal to the overlapping surface midway between the peripheral edges thereof to a point where the line intersects the longitudinal axis of the working circumference of the piston ring.

The radius R of the imaginary cylinder surface for any given piston ring may be readily determined by the formulæ

$$R = \frac{\frac{F+W}{4} - .4d}{\text{sine of angle } A}$$

or $$R = (.25(F+W) - .4d)\left(\sqrt{\frac{d^2}{w^2}+1}\right)$$

In the above formulæ, F equals the free diameter of the piston ring as shown in Fig. 1; W equals the working diameter of the ring as shown in Fig. 2; $d$ equals the depth of the piston ring at the joint; $w$ equals the width of the ring and A is the acute angle of the sealing face with respect to a side face of the piston ring as shown in Fig. 3. The distance between the longitudinal axis of the working surface of the piston ring and the point on the overlapping surfaces, referred to above, is represented by V and this distance is equal to $$\frac{F+W}{4} - .4d \text{ or } .25(F+W) - .4d.$$

Since the angle A' is the same as angle A, the radius R of the cylinder can readily be determined from the first of the above formulæ.

The radius R may be determined when the angle A is unknown by the second formulæ wherein the facts are considered that $$.8w : V :: \sqrt{(.8w)^2 + (.8d)^2} : R$$

or $$R = \frac{.25(F+W) - .4d\sqrt{(.8w)^2 + (.8d)^2}}{.8w}$$

$$R = \frac{(.25(F+W) - .4d)(\sqrt{d^2+w^2})}{w}$$

$$R = (.25(F+W) - .4d)\left(\sqrt{\frac{d^2+w^2}{w^2}}\right)$$

$$R = (.25(F+W) - .4d)\left(\sqrt{\frac{d^2}{w^2}+1}\right)$$

In order to produce the complementary and substantially coincident overlapping surfaces having the desired contour, a milling cutter 9 having cutting teeth 11 is provided, the cutting edges thereof being concave and the center of curvature thereof being substantially in the plane of the right face of the cutter, or the face adjacent the cutter 12, and the radius of curvature being equal to R. The milling cutter is designed to cut the notch 6 in the ring having a cylindrical surface with a radius R and an axis S intersecting the axis T of the working circumference of the piston ring.

A second milling cutter 12, having cutting teeth 13 is provided, the cutting edges thereof being convex and the center of curvature thereof being substantially in the plane of the left face of the cutter or the face adjacent the cutter 9, and the radius of curvature being equal to R. This milling cutter is designed to cut away the end 3 of the ring to produce the tongue 5 having a cylindrical surface with a radius R corresponding to the surface on the end 2 of the ring.

Since the axes of curvature of the overlapping cylindrical surfaces cut upon the ends of the ring are coincident, and the radii of curvature are equal, the surfaces are coincident when overlapped as in the working position, and thus snugly engage and constitute a fluid tight joint.

It will be understood that the piston ring 1, before it is cut, is clamped or otherwise supported in an angular position with respect to a plane passing through the axes of the milling cutters 9 and 12 as indicated in Fig. 5 and that the milling cutters are reciprocated in a horizontal plane in order to cut the notches of the piston ring to the desired depth. After the notches have been cut the ends are severed at a point between the notches. The piston ring then appears as illustrated in Fig. 1, and the severed ends of the ring when in the free position terminate substantially in a plane radial to the axis of the imaginary cylinder.

Since the radii of curvature of the cutting edges of the teeth of the respective milling cutters are equal and their respective centers of curvature are substantially in the planes of the respective adjacent side faces of the cutters, the axes of curvature of the cylindrical surfaces on the end portions of the ring cut by the cutters are substantially coincident, and as the radii of curvature of the surfaces are equal, the surfaces are substantially coincident when overlapped as when the ring is in the working condition shown in Fig. 2.

It is apparent from the foregoing, that I have provided a piston ring having an improved form of overlapped joint wherein the overlapping surfaces thereof, though constituting a section of a cylindrical surface, which may be economically produced, afford maximum effectiveness in sealing against leakage past the piston ring joint.

While I have shown but one embodiment of my invention, it is obvious that many changes, additions and omissions may be made in the construction without departing from the spirit of my invention.

Having now described my invention, what I claim as new and desire to secure by Letters Patent, is:

1. A split step-cut piston ring having its ends provided with diagonally disposed overlapping surfaces, the said surfaces constituting a section of a cylinder and having a radius greater than the distance between the center of the ring and a point in the overlapping surfaces midway between the peripheral edges thereof.

2. A split step-cut piston ring having its ends provided with diagonally disposed overlapping surfaces, the said surfaces constituting sections of a cylinder having a radius substantially equal to the formula $$\frac{\frac{F+W}{4} - .4d}{\text{sine of angle } A}$$

wherein $F$ is the free diameter of the ring, $W$ is the working diameter of the ring, $d$ is the depth of the ring at the overlapping joint and the angle $A$ is the acute angle of the overlapping surface with respect to the flat side of the ring.

3. A split step-cut piston ring having its ends provided with diagonally disposed overlapping surfaces, the said surfaces constituting a section of a cylinder having a radius substantially equal to the length of a line drawn from and normal to the overlapping surfaces midway between their peripheral edges to a point at which the line intersects the longitudinal axis of the working circumference of the ring.

4. A split step-cut piston ring having its ends provided with overlapping portions having co-operating engaging surfaces constituting a section of a cylinder disposed at an angle to the plane of the ring, and intersecting the cylindrical surface of the ring and an adjacent side thereof, the said cylinder having such radius that its center is coincident with a point on the longitudinal axis of the working circumference of the ring.

OSCAR S. McCURDY.